(12) United States Patent
Fitzpatrick et al.

(10) Patent No.: US 7,671,877 B2
(45) Date of Patent: Mar. 2, 2010

(54) MULTI-IMAGER SYSTEM USING REFLEX WRITING AND LATERAL IMAGE REGISTRATION

(75) Inventors: Anne Fitzpatrick, Rochester, NY (US); Michael Martin, Hamlin, NY (US); David Kerxhalli, Rochester, NY (US); Tom Baretsky, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 691 days.

(21) Appl. No.: 11/550,200

(22) Filed: Oct. 17, 2006

(65) Prior Publication Data

US 2008/0088691 A1    Apr. 17, 2008

(51) Int. Cl.
   *B41J 2/435* (2006.01)
(52) U.S. Cl. .................. 347/116; 347/234; 347/235; 347/250; 399/301
(58) Field of Classification Search ................. 347/116, 347/234, 235, 250; 399/301
   See application file for complete search history.

(56) References Cited

U.S. PATENT DOCUMENTS

| | | | | |
|---|---|---|---|---|
| 5,113,202 A * | 5/1992 | Loce et al. | ................... | 347/232 |
| 5,208,636 A * | 5/1993 | Rees et al. | ................... | 399/159 |
| 5,281,999 A * | 1/1994 | Edmunds | ..................... | 399/119 |
| 5,394,223 A * | 2/1995 | Hart et al. | .................... | 399/165 |
| 7,126,621 B2 * | 10/2006 | Castelli et al. | .............. | 347/234 |
| 7,215,348 B2 * | 5/2007 | Nomura et al. | ............. | 347/132 |
| 2007/0120938 A1 * | 5/2007 | Fitzpatrick et al. | .......... | 347/116 |

* cited by examiner

*Primary Examiner*—Huan H Tran
(74) *Attorney, Agent, or Firm*—Oliff & Berridge, PLC

(57) ABSTRACT

A lateral position of a photoreceptor belt is detected by at least a first sensor and a second sensor, respectively located near a first imager and a second imager. The detected lateral positions of the photoreceptor belt by the first sensor is compared to the detected lateral position of the photoreceptor belt by the second sensor. Based on this compared difference, a correction is applied to the position of the second imager relative to the photoreceptor belt. To apply the correction, the location of the start of scan (SOS) of the respective imagers is moved.

20 Claims, 3 Drawing Sheets

MULTI-IMAGER SYSTEM USING REFLEX WRITING AND LATERAL IMAGE REGISTRATION

BACKGROUND

Exemplary embodiments relate generally to imaging devices, and more particularly to imaging devices with a plurality of imagers that provide sequential images that are overlaid to form a composite image.

Imaging devices often utilize a first color to produce a first image, portions of which are desired to be highlighted using a second color. In order to produce the desired results, the imaging device must precisely register the highlighted color image with the first image.

Highlight color image registration is often challenging. It is often the case that a highlight printer is designed as a retrofit of a monochromatic engine in which the quality of the motion of the photoreceptor is only sufficient to limit the banding to a tolerable level. The monochromatic image is typically laid down at a constant rate of lines per unit time by a first imager. If a second imager (to highlight the first image using a second color) is also caused to write at a constant rate, serious errors in color to color registration may occur.

In single pass electrophotographic printers having more than one process station that provide sequential images to form a composite image, critical control of the registration of each of the sequenced images is required. This is also true in multiple pass color printers, which produce sequential developed images superimposed onto a photoreceptor belt for charging with toner to form a multi-color image. Failure to achieve registration of the images results in printed copies in which the color separations forming the images are misaligned. This condition is generally obvious upon viewing of the copy because such copies usually exhibit fuzzy color separation between color patches, bleeding and/or other errors. These errors may make such copies unsuitable for intended uses.

A typical highlight color reproduction machine records successive electrostatic latent images on the photoconductive surface. One latent image is usually developed with black toner. The other latent image is developed with color highlighting toner, e.g., red toner. These developed toner powder images are transferred to a sheet to form a color-highlighted document. When combined, these developed images form an image corresponding to the entire original document being printed. This color highlighting reproduction machine can be of the so-called single-pass variety, where the color separations are generated sequentially by separate imaging and toning stations, or of the so-called multiple-pass variety, where the separations are generated by a single imaging station in subsequent passes of the photoreceptor and are alternatively toned by appropriate toning stations.

A particular variety of single-pass highlight color reproduction machines using tri-level printing have also been developed. Tri-level electro-statographic printing is described in greater detail in U.S. Pat. No. 4,078,929. As described in this patent, the latent image is simultaneously developed with toner particles of first and second colors. The toner particles of one of the colors are positively charged, and the toner particles of the other color are negatively charged.

Another type of color reproduction machine which may produce highlight color copies initially charges the photoconductive member. Thereafter, the charged portion of the photoconductive member is discharged to form an electrostatic latent image thereon. The latent image is subsequently developed with black toner particles. The photoconductive member is then recharged and exposed to record the highlight color portions of the latent image thereon. A highlight latent image is then developed with toner particles of a color other than black, e.g., red, and then developed to form the highlight latent image. Thereafter, both toner powder images are transferred to a sheet and subsequently fused thereto to form a highlight color document.

Exemplary operations of highlight and color printers are described in greater detail in U.S. Pat. Nos. 5,113,202, 5,208,636, 5,281,999 and 5,394,223, the disclosures of which are hereby incorporated herein by reference in their entireties.

A hybrid reflex writing printer is described in commonly-owned U.S. patent application Ser. Nos. 10/909,075 and 11/289,888, which are also incorporated herein by reference in their entireties.

SUMMARY

A simple, relatively inexpensive, and/or accurate approach to register latent images superimposed in printing systems is advantageous, especially when applied to the design, manufacture and use of electrophotographic printers, and particularly advantageous in the color and highlight color portion of electro-photography. The need to provide accurate and inexpensive registration has become more acute as the demand for high quality, relatively inexpensive color images has increased.

The presently disclosed imaging device utilizes a first imager for forming a first latent image and at least a second imager for forming the highlight latent image. The second imager forms the highlight latent image at a time following the forming of the first latent image. The forming of the highlight latent image accounts for irregularities in the movement of the photoreceptor belt between the first imager and the second imager. In particular, at least a first sensor and a second sensor, respectively located near the first imager and the second imager, detect the lateral position of a photoreceptor belt of the imaging device. The detected position, and more specifically the detected lateral position of the photoreceptor belt, by the first sensor is compared to the detected position of the photoreceptor belt by the second sensor. A correction is applied based on this compared difference. To apply the correction, the location between imaging at the first and second imagers is adjusted at the second imager. For example, the start of scan (SOS) of the respective imagers may be moved. If the second imager is an LED bar, the recalculation of scanline non-linearity (SNL) and fastscan magnification (FSM) are simplified. Additionally, the correction can be recalculated at multiple points within the image to accommodate the variation in belt lateral location within an image pitch distance.

According to one aspect of the disclosure an imaging device for producing multicolor images includes a photoreceptor belt, a first imager to generate an output in a first color at a first exposure station on the photoreceptor belt, and a second imager to generate an output in a second color at a second exposure station on the photoreceptor belt. The output in the second color corresponds to the output in the first color. The photoreceptor belt may be configured to pass the first imager and the second imager in a process path. The imaging device according to this aspect of the disclosure may further include a first belt edge sensor disposed upstream of the first imager with respect to the process path and a second belt edge sensor disposed upstream of the second imager with respect to the process path. The first belt edge sensor may detect a first lateral position of the photoreceptor belt, and the second belt edge sensor may detect a second lateral position of the photoreceptor belt. A controller may determine the difference between the first lateral position and the second lateral position of the photoreceptor belt, and apply a correction. For example, the controller may move the location of the start of scan line of the second imager based on the determined difference between the first lateral position and the second lateral position of the photoreceptor belt.

BRIEF DESCRIPTION OF THE DRAWINGS

A more complete understanding of the disclosed apparatus can be obtained by reference to the accompanying drawings wherein.

DETAILED DESCRIPTION OF EMBODIMENTS

Exemplary methods and systems disclosed herein are directed to the color-to-color registration errors caused by irregularities in the photoreceptor belt motion, for example, due to variations in the drive system of an imaging device. In an exemplary embodiment, a proposed method employed by a machine controller utilizes belt sensors to monitor the lateral position of a photoreceptor belt in an imaging device in a manner to be explained below.

Exemplary methods and devices are described for an imaging device, such as, for example, a multiple-color highlight imaging device having a belt photoreceptor system. Those skilled in the art will recognize that the teachings of the present disclosure may be applied to a printer or other imaging device, such as a photocopy machine or multifunctional printer/copier, or any other relevant device that utilizes a system that drives a belt.

Figure 1:
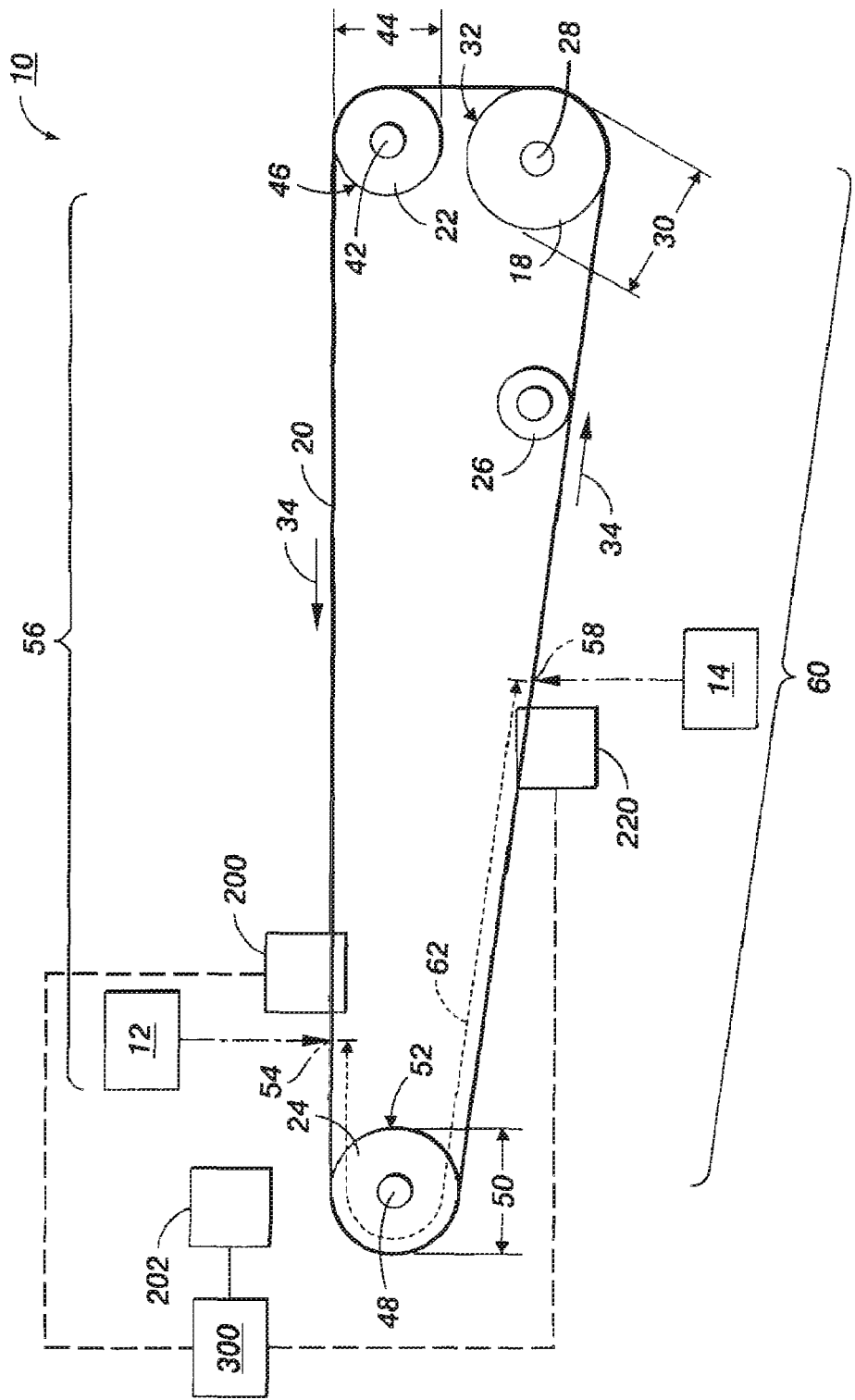
FIG. 1 is a schematic side view of an imaging in an exemplary embodiment.

FIG. 1 is a schematic that shows a two-color highlight imaging device 10. Belt charging stations, toner application stations, image transfer stations, substrate transport stations, substrate developer stations and belt cleaning stations are not shown in FIG. 1 for clarity. The exemplary embodiments are intended to cover all presently known and later developed devices that are applicable to the present disclosure.

Figure 2:
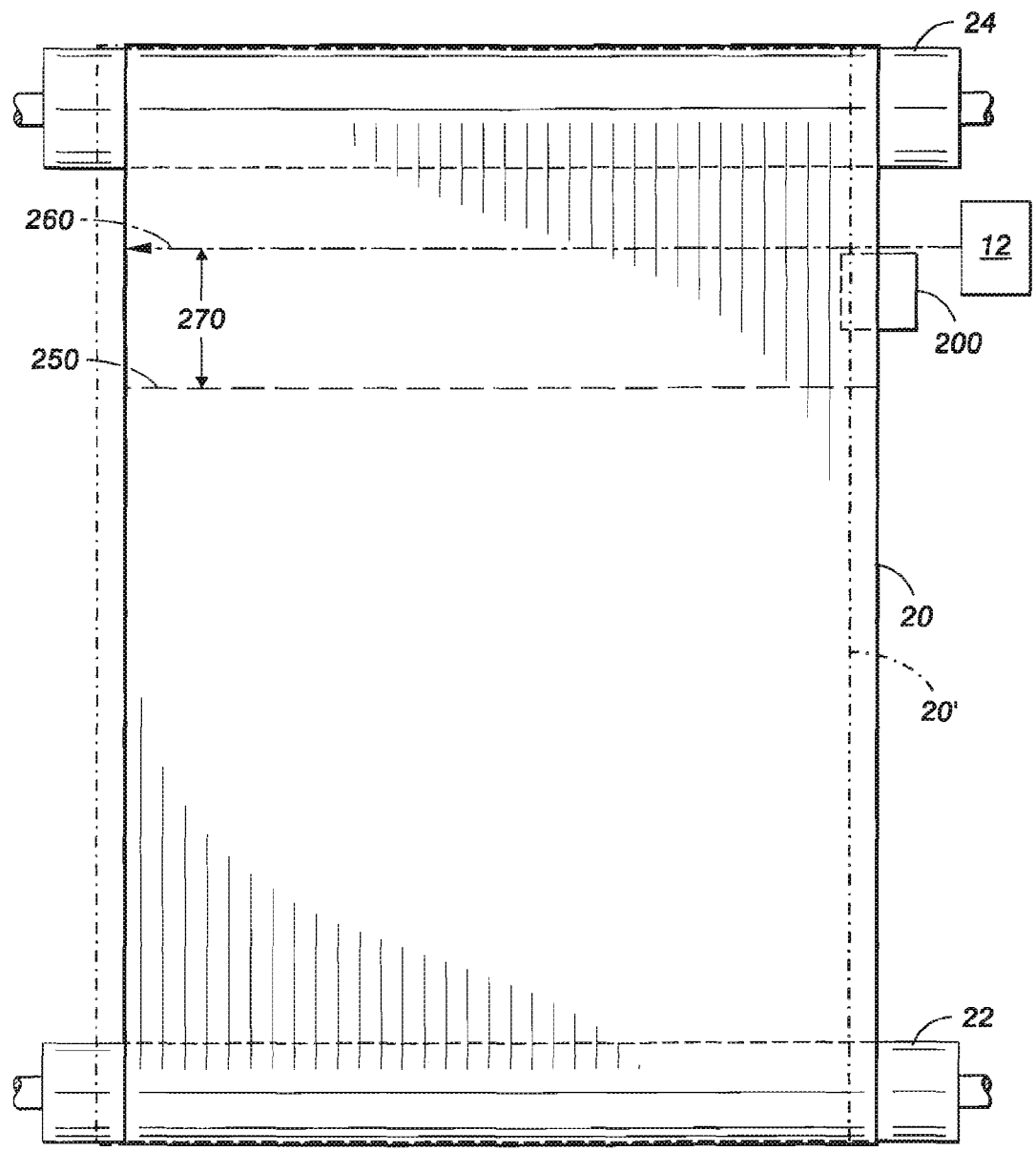
FIG. 2 is a schematic of a top view of a photoreceptor belt of the imaging device of FIG. 1.

An exemplary imaging device 10 may include a photoreceptor belt 20 that is mounted for rotation about a plurality of rollers 18, 22, 24, 26. The rollers 18, 22, 24, 26 may be mounted to a frame of the imaging device 10. The photoreceptor belt 20 may be constructed as a belt with opposite ends attached together to create an endless or continuous belt. A seam 250 may be formed where opposite ends of the belt are attached (see FIG. 2).

In the illustrated exemplary embodiment, the plurality of rollers may include a stripper roller 22, a drive roller 18, a tension roller 24 and a guide roller 26. The rollers 18, 22, 24 and 26 may define a process path along which the photoreceptor belt 20 progresses during image production. Fewer or more rollers may be utilized to define the process path guiding the photoreceptor belt 20 as it moves in a process direction (indicated by arrow 34).

In the illustrated exemplary embodiment, the drive roller 18 may be a generally cylindrical roller having an axis 28, a nominal diameter 30, and a drive surface 32 having a nominal circumference formed generally concentrically about the axis 28. The drive roller 18 may be mounted to the frame of the imaging device 10 to rotate when driven about its axis 28. The axis 28 may be mounted generally perpendicular to the process direction 34.

In the illustrated exemplary embodiment, the stripper roller 22 may be a generally cylindrical roller having an axis 42, a nominal diameter 44 and a belt engaging surface 46 formed generally concentrically about the axis 42. The stripper roller 22 may be mounted to the frame of the imaging device 10 to rotate about its axis 42. The axis 42 may be mounted generally perpendicular to the process direction 34. In the illustrated exemplary embodiment, the stripper roller 22 may be mounted downstream of the driver roller 18, along the process path, in the process direction 34. In the illustrated exemplary embodiment, the nominal diameter 44 of the stripper roller 22 is smaller than the nominal diameter 30 of the drive roller 18.

In the illustrated exemplary embodiment, the tension roller 24 may be a generally cylindrical roller having an axis 48, a nominal diameter 50 and a belt-engaging surface 52 formed generally concentrically about the axis 48. The tension roller 24 may be mounted to the frame of the imaging device 10 to rotate about its axis 48. The tension roller 24 may be mounted for linear movement relative to the frame of the imaging device 10 perpendicularly to its axis 48. The tension roller 24 may move linearly to maintain the axis 48 on a plane substantially parallel to a surface of the photoreceptor belt 20 in a span between rollers 22 and 24. A force may be applied to provide tension to the photoreceptor belt 20. The axis 48 may be mounted generally perpendicular to the process direction (indicated by arrow 34). In the illustrated exemplary embodiment, the nominal diameter 50 of the tension roller 24 is smaller than the nominal diameter 30 of the drive roller 18.

In the simplified exemplary embodiment illustrated in FIG. 1, a single guide or idler roller 26 may be mounted to the frame of the imaging device 10 to aid in defining the process path along which the photoreceptor belt 20 travels. Those skilled in the art will recognize that a typical imaging device 10 may include a plurality, of such guide or idler rollers 26 mounted to the frame of the imaging device 10 acting to support the photoreceptor belt 20 and/or to define the process path along which the photoreceptor belt 20 travels. Additional structures, such as backer bars or rollers, blades and other components may aid in supporting the photoreceptor belt 20 and defining the process path along which it progresses, within the scope of the disclosure.

The first imager 12 may be located between the tension roller 24 and the stripper roller 22 and may produce a latent image on the photoreceptor belt 20 as the photoreceptor belt 20 passes by the first imager 12. The first imager 12 may be mounted adjacent the photoreceptor belt 20 and may scan an image at a first exposure station 54 onto the photoreceptor belt 20. The first exposure station 54 may be positioned along the process path between the stripper roller 22 and the tension roller 24 in what will be referred to herein as the first imager span 56 of the process path. In the illustrated exemplary embodiment, the first imager 12 may be a laser Raster Output Scanner ("ROS") of the type commonly used in monochromatic imaging devices.

A first belt edge sensor 200, which monitors the spatial location of the photoreceptor belt 20 in a lateral direction, may be mounted just upstream of the first imager 12. The first belt edge sensor 200 may take a location reading to determine a value of the location of the photoreceptor belt 20 at the time of writing of the first imager 12. This value may be stored in a memory 202, such as, for example, a FIFO memory log. In an exemplary embodiment, the first belt sensor 200 may be located as close as possible to the first imager 12. The close proximity of the first belt cage sensor 200 to the first imager 12 allows for an accurate measurement of the lateral location of the photoreceptor belt at the first imager 12. The distance between the first belt edge sensor 200 and the first imager 12 may be less than the distance between the seam 250 of the photoreceptor belt 20 and the start of the imaging area of the first pitch immediately following the seam 250. This distance may avoid error due to belt transients caused by the belt seam within the correction scheme. However, empirical testing shows that the difference between the point at which the first belt edge sensor 200 is reading and the first imager 12, in terms of lateral image registration, is somewhat negligible.

The second imager 14 may be located between the tension roller 24 and the guide roller 26 and may produce a second image on the photoreceptor belt 20 as the photoreceptor belt passes by the second imager 14. The second imager 14 may be mounted adjacent to the photoreceptor belt 20 and may scan an image at a second exposure station 58 onto the photoreceptor belt 20. The second exposure station 58 may be positioned along the process path between the tension roller 24 and the drive roller 18 in what will be referred to herein as the second imager span 60 of the process path. The second exposure station 58 may be displaced in the process direction along the process path by a displacement 62 from the first exposure station 54. In the illustrated exemplary embodiment, the second imager 14 is a Light Emitting Diode ("LED") bar that can scan an image line on demand. However, the second imager 14 may be a ROS scanner, or the like.

A second belt edge sensor 220, which monitors the spatial location of the photoreceptor belt 20 in a lateral direction, may be mounted just upstream the second imager 14. The second belt edge sensor 220 may take a location reading to determine a value of the location of the photoreceptor belt 20 at the time of writing of the second imager 14. This value is stored in the memory 202. In an exemplary embodiment, the second belt edge sensor 220 may be located as close as possible to the second imager 14. The close proximity of the second belt edge sensor 220 to the second imager 14 allows for an accurate measurement of the lateral location of the photoreceptor belt at the second imager 14. The distance between the second belt edge sensor 220 and the second imager 14 may be less than the distance between the seam 250 of the belt and the start of the imaging area of the second pitch immediately following the seam 250. This distance may avoid error due to belt transients caused by the belt seam within the correction scheme. However, empirical testing shows that the difference between the point at which the second belt edge sensor 220 is reading and the second imager 14, in terms of lateral image registration, is somewhat negligible.

Figure 3:
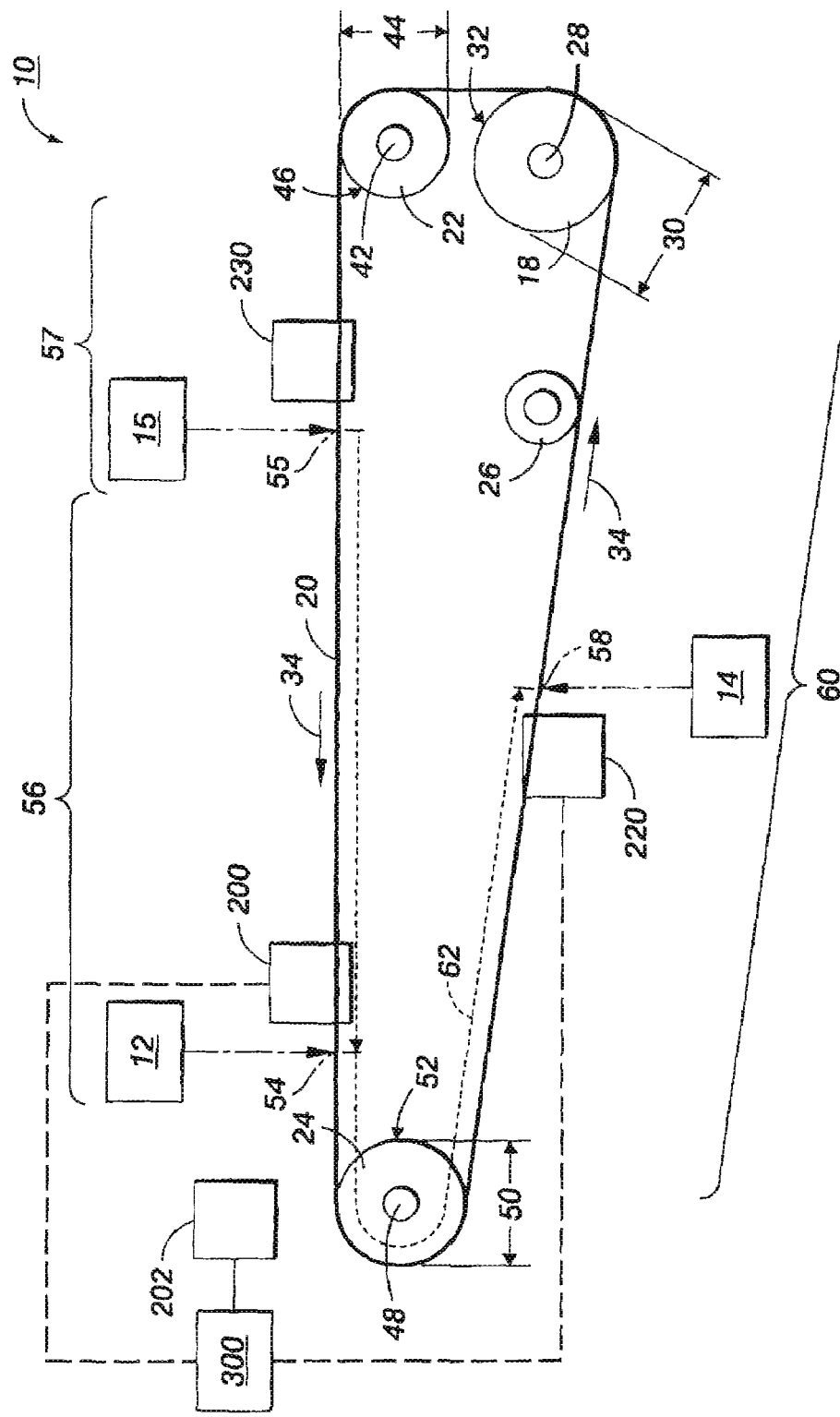
FIG. 3 is a schematic side view of an imaging device in another exemplary embodiment.

With reference to the illustrated exemplary embodiment of FIG. 3, a third imager 15 may be located between the tension roller 24 and the stripper roller 22, upstream of the first imager 12, and may produce a third image on the photoreceptor belt 20 as the photoreceptor belt 20 passes by the third imager 15. The third imager 15 may be mounted adjacent the photoreceptor belt 20 and may scan an image at a third exposure station 55 onto the photoreceptor belt 20. The third exposure station 55 may be positioned along the process path between the stripper roller 22 and the tension roller 24, upstream of the first imager span 56, in what will be referred to herein as the third imager span 57 of the process path. In the illustrated exemplary embodiment, the third imager 15 may be a LED bar that can scan an image line on demand. However, the third imager 15 may also be a ROS scanner, or the like.

A third belt edge sensor 230, which monitors the spatial location of the photoreceptor belt 20 in a lateral direction, may be mounted just upstream the third imager 15. The third belt edge sensor 230 may take a location reading to determine a value of the location of the photoreceptor belt 20 at the time of writing of the third imager 15. This value may be stored in the memory 202. In an exemplary embodiment, the third belt edge sensor 230 may be located as close as possible to the third imager 15. The close proximity of the third belt edge sensor 230 to the third imager 15 allows for an accurate measurement of the lateral location of the photoreceptor belt at the third imager 15. The distance between the third belt edge sensor 230 and the third imager 15 may be less than the distance between a seam of the belt and the start of the imaging area of the first pitch immediately following the seam. This distance may avoid error due to belt transients caused by the belt seam within the correction scheme. However, empirical testing shows that the difference between the point at which the third belt edge sensor 230 is reading and the third imager 15, in terms of lateral image registration, is somewhat negligible.

It is envisioned that any number of imagers and sensors, of varying types, may be used with the exemplary devices and methods described herein. Furthermore, the placement of these imagers and sensors may vary and the exemplary locations of the imagers and sensors described herein are not intended to limit the scope of the embodiments.

In an exemplary embodiment, the lateral position of the photoreceptor belt 20 that is detected by the first belt edge sensor 200 located near the first imager 12 may be compared to the lateral position of the photoreceptor belt 20 that is detected by the second belt edge sensor 220 located near the second imager 14. Based on this compared difference, a correction may be applied to the photoreceptor belt 20.

For example, when the photoreceptor belt 20 cycles up to print a job, immediately prior to a first image being printed by the first imager 12, the first belt edge sensor 200 may take a reading of the lateral position of the photoreceptor belt 20 at the time of writing of the first imager 12. The value of the lateral position of the photoreceptor belt 20 at the time of writing of the first imager 12 may be stored in the memory 202. Successive readings may be taken during the imaging of the first image by the first belt edge sensor 200. The lateral location of the photoreceptor belt 20, as well as a scanline of which the reading corresponds to, may be stored in the memory 202. The frequency of the readings may be determined by the processing power of the system, and/or the banding constraints which exist.

When the first image is about to be imaged at the second imager 14, the second belt edge sensor 220 may take a reading of the lateral position of the photoreceptor belt 20 at the time that the first image is about to be imaged at the second imager 14. A controller 300 may compare a value of the lateral position of the photoreceptor belt 20 at the time that the first image of the job is about to be imaged at the second imager 14 with the value of the lateral position of the photoreceptor belt 20 at the time of writing of the first imager 12 stored in the memory 202. The difference between the values representing the positions of the photoreceptor belt 20 taken at the first imager 12 and the second imager 14, for the same image, may calculated and this calculated value may be used to adjust the second imager 14 and/or first imager 12.

For example, the calculated value between the two positions may be added to the Pixel 1 Placement for the second imager immediately prior to the firing of the particular scanline, and the image may be shifted laterally based on this value. (The Pixel 1 Placement is the value which determines the lateral margin of the image on the LED bar. It is effectively the specification of the first pixel of actual image data within the array on the bar.)

The Pixel 1 Placement location may be updated at the frequency based on the frequency of the successive readings taken during the imaging of the first image by the first belt edge sensor 200. As discussed above, the frequency of the readings may be determined by the processing power of the system, and/or the banding constraints which exist.

For the scanlines of image data which do not have an updated Pixel 1 Placement applied thereto, the Pixel 1 Placement may be that which was previously calculated for the nearest scanline.

In the illustrated exemplary embodiment of FIG. 3, when the first image is about to be imaged at the third imager 15, the third belt edge sensor 230 may take a reading of the lateral position of the photoreceptor belt 20 at the time that the first image is about to be imaged at the third imager 15. The controller 300 may compare a value of the lateral position of the photoreceptor belt 20 at the time that the first image of the job is about to be imaged at the third imager 15 with the value of the lateral position of the photoreceptor belt 20 at the time of writing of the first imager 12 stored in the memory 202. The difference between the position of the photoreceptor belt 20 taken at the first imager 12 and the third imager 15, for the same image, may be calculated and this calculated value may be used to adjust the third imager 15 or the first imager 12.

For example, the calculated value between the two positions may be added to the Pixel 1 Placement for the third imager 15 immediately prior to the firing of the particular scanline, and the image may be shifted laterally based on this value.

A learning routine, where average position of the belt edge at each belt edge sensor is detected and stored in memory 202, and then corrections based on the difference of the current reading from the average learned edge can also be used with this system. One application of such a scheme would involve subtracting the learned average at the positions of each imager from the current readings at each respective imager.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An imaging device for producing multicolor images, the imaging device comprising:
   a photoreceptor belt;
   a first imager to generate an output of a first color at a first exposure station on the photoreceptor belt;
   a second imager to generate an output of a second color at a second exposure station on the photoreceptor belt, the output of the second color corresponding to the output of the first color;
   the photoreceptor belt configured to pass the first exposure station and the second exposure station in a process path;
   a first belt edge sensor disposed near the first imager, the first belt edge sensor detecting a first lateral position of the photoreceptor belt;
   a second belt edge sensor disposed near the second imager, the second belt edge sensor detecting a second lateral position of the photoreceptor belt; and
   a controller to determine a difference between the first lateral position and the second lateral position of the photoreceptor belt, a location of imaging of at least one of the second imager and the first imager being moved based on the determined difference.

2. The imaging device of claim 1, wherein the first imager has a start of scan line, the second imager has a start of scan line, and the location of the start of scan line of the second imager or the start of scan line of the first imager is moved based on the determined difference between the first lateral position and the second lateral position of the photoreceptor belt.

3. The imaging device of claim 1, wherein the first belt edge sensor is disposed upstream of the first imager with respect to the process path, and the second belt edge sensor is disposed upstream of the second imager with respect to the process path.

4. The imaging device of claim 1, wherein a photoreceptor drive system coupled to the photoreceptor belt drives the photoreceptor belt in the process path past the first and second imagers in a process direction along the process path.

5. The imaging device of claim 1, wherein the photoreceptor belt carries the output generated by the first imager to the second exposure station where the second imager generates the output of the second color corresponding to the output of the first imager.

6. The imaging device of claim 5, wherein the second belt edge sensor detects the second lateral position of the photoreceptor belt when the output generated by the first imager reaches the second exposure station.

7. The imaging device of claim 1, wherein the first belt edge sensor successively detects the lateral position of the photoreceptor belt at the first exposure station, and the second belt edge sensor successively detects the lateral position of the photoreceptor belt at the second exposure station.

8. The imaging device of claim 1, further comprising:
   a third imager to generate an output of a third color at a third exposure station on the photoreceptor belt, the output of the third color corresponding to the output of the first color,
   the photoreceptor belt configured to pass the first exposure station, the second exposure station, and the third exposure station in the process path; and
   a third belt edge sensor disposed near the third imager, the third belt edge sensor detecting a third lateral position of the photoreceptor belt,
   the controller determining a difference between the first lateral position and the third lateral position of the photoreceptor belt, a location of imaging of at least one of the third imager and the first imager being moved based on the determined difference.

9. The imaging device of claim 8, wherein the first imager has a start of scan line, the third imager has a start of scan line, and the location of the start of scan line of the third imager is moved based on the determined difference between the first lateral position and the third lateral position of the photoreceptor belt.

10. The imaging device of claim 9, wherein the third belt edge sensor detects the third lateral position of the photoreceptor belt when the output generated by the first imager reaches the third exposure station.

11. The imaging device of claim 8, wherein the first belt edge sensor successively detects the lateral position of the photoreceptor belt at the first exposure station, and the third belt edge sensor successively detects the lateral position of the photoreceptor belt at the third exposure station.

12. A method of producing multicolor images with an imaging device, the method comprising:
   generating an output of a first color at a first exposure station on a photoreceptor belt with a first imager;

generating an output of a second color at a second exposure station on the photoreceptor belt with a second imager, the output of the second color corresponding to the output of the first color;

configuring the photoreceptor belt to pass the first imager and the second imager in a process path;

detecting a first lateral position of the photoreceptor belt;

detecting a second lateral position of the photoreceptor belt; and determining a difference between the first lateral position and the second lateral position of the photoreceptor belt and moving location of imaging of the second imager based on the determined difference.

13. The method of claim 12, wherein the image of the first color travels in the process direction toward the second exposure station on the photoreceptor belt, and wherein the second lateral position of the photoreceptor belt is detected when the image of the first color reaches the second exposure station.

14. The method of claim 13, wherein the second color is registered after the image of the first color reaches the second exposure station.

15. The method of claim 12, further comprising:

successively detecting a lateral position of the photoreceptor belt at the first exposure station; and successively detecting a lateral position of the photoreceptor belt at the second exposure station.

16. The method of claim 12, further comprising:

generating an output of a third color at a third exposure station on the photoreceptor belt with a third imager, the output of the third color corresponding to the output of the first color;

configuring the photoreceptor belt to pass the first imager, the second imager and the third imager in the process path;

detecting a third lateral position of the photoreceptor belt; and determining a difference between the first lateral position and the third lateral position of the photoreceptor belt and moving a location of imaging of at least one of the second imager and the third imager based on the determined difference.

17. The method of claim 16, wherein the first imager has a start of scan line, the third imager has a start of scan line, and the location of the start of scan line of the third imager is moved based on the determined difference between the first lateral position and the third lateral position of the photoreceptor belt.

18. The method of claim 16, wherein the third belt edge sensor detects the third lateral position of the photoreceptor belt when the output generated by the first imager reaches the third exposure station.

19. The imaging device of claim 8, wherein the first belt edge sensor successively detects the lateral position of the photoreceptor belt at the first exposure station, and the third belt edge sensor successively detects the lateral position of the photoreceptor belt at the third exposure station.

20. A system of producing multicolor images with an imaging device, the system comprising:

means for generating an output of a first color at a first exposure station on a photoreceptor belt;

means for generating an output of a second color at a second exposure station on the photoreceptor belt, the output of the second color corresponding to the output of the first color;

means for configuring the photoreceptor belt to pass the first exposure station and the second exposure station in a process path;

means for detecting a first lateral position of the photoreceptor belt;

means for detecting a second lateral position of the photoreceptor belt; and means for determining a difference between the first lateral position and the second lateral position of the photoreceptor belt and moving a location of imaging of the means for generating the output of the second color based on the determined difference.

* * * * *